United States Patent
Mesa

[19]

[11] Patent Number: 6,101,731
[45] Date of Patent: Aug. 15, 2000

[54] GUIDE CLIPS FOR CUTTING DRYWALLS ACCESS HOLES

[76] Inventor: Antonio Mesa, 1612 N. Polk, Little Rock, Ark. 72207

[21] Appl. No.: 09/076,595

[22] Filed: May 12, 1998

[51] Int. Cl.⁷ .................................................. G01B 3/00
[52] U.S. Cl. ........................................ 33/528; 33/DIG. 10
[58] Field of Search .................... 33/528, 562, 645, 33/DIG. 10

[56] References Cited

U.S. PATENT DOCUMENTS

| | | | |
|---|---|---|---|
| 2,775,812 | 1/1957 | Mohr | 33/DIG. 10 |
| 2,788,151 | 4/1957 | Shore | 33/528 |
| 2,898,668 | 8/1959 | Cottar | 33/528 |
| 3,391,460 | 7/1968 | Moore | 30/358 |
| 3,733,707 | 5/1973 | Nix | 33/180 |
| 3,823,754 | 7/1974 | Nix | 144/323 |
| 3,888,013 | 6/1975 | Benoit | 33/174 |
| 3,940,857 | 3/1976 | Giordano | 33/DIG. 10 |
| 3,943,631 | 3/1976 | Smugor | 33/528 |
| 4,059,905 | 11/1977 | Wieting | 33/180 |
| 4,335,511 | 6/1982 | Bowling | 30/366 |
| 4,359,302 | 11/1982 | Payne | 409/84 |
| 4,730,395 | 3/1988 | Blessing | 30/360 |
| 4,951,395 | 8/1990 | Lameiro | 30/360 |
| 5,301,437 | 4/1994 | Burke | 33/528 |

*Primary Examiner*—G. Bradley Bennett
*Attorney, Agent, or Firm*—Stephen D. Carver

[57] ABSTRACT

A clip system for accurately locating access openings in drywall panels for electrical outlets, junction boxes, conduit boxes, or other receptacles normally concealed within the wall. A plurality of resilient, disposable plastic clips are snap fitted to either the corners or the edges of various outlets, outlet covers, or similar structures requiring an access opening. Each clip comprises a resilient frame and a smaller, spaced apart, offset subframe that is yieldably deflectable. A deflectable wall connects the frame and subframe. A channel is formed between the frame and the subframe for captivating a portion of the outlet upon which the clip is forcibly inserted. Each clip supports a sharp, outwardly projecting prong that penetrates the drywall panel after installation. The clips occupy specific sections of the outlets, so that when the wallboard is installed, the tradesman may use the projecting prongs as a marking guide. Suitable bosses and internal configurations are employed to firmly grasp the outlet box when the clip is snap fitted, so that alignment is firmly preserved, even when wallboard is pressed against the clip prongs. The prongs can be removed easily prior to marking or cutting. The disposable clips need not be removed.

15 Claims, 13 Drawing Sheets

GUIDE CLIPS FOR CUTTING DRYWALLS ACCESS HOLES

BACKGROUND OF THE INVENTION

I. Field of the Invention

My invention relates generally to the cutting and measurement of sheet materials during building construction. More particularly, the present invention relates to a system using disposable, snap-on guide clips for accurately marking sheet materials such as gypsum wallboard with the location of access holes for desired electrical and telephone outlet boxes and the like.

II. Description of the Prior Art

In modern construction a variety of generally planar, sheet like materials are used for constructing interior walls. Preformed drywall panels are placed over the interior framing to finish walls or ceilings after electrical prewiring. Those familiar with dry wall construction techniques will recognize that many different types of panels including veneers, particle board, sheet rock, or wallboard are common. Ordinarily the exterior and internal walls are first framed with suitable, spaced apart studs. The electrical wiring then proceeds. Various fixtures that house switches, electrical outlet plugs, and ceiling fixture connections, are mounted to the framing studs to safely terminate the conductors. Such fixtures and junction boxes include outlet boxes for A. C. power, cable television feeds, prewired telephone installations, intercom wiring, air conditioning vents, and the like. These outlet boxes are located to and extend through access openings formed in the covering members. The outlet boxes enable the final connections to be completed after wall panels are installed. Certain plumbing lines or fixtures may also be installed just after completion of the framing.

Modern outlet boxes are made of plastic or metal. They facilitate secure containment of the wires or pipes that are connected to the outlets or other terminal fixtures that are in turn mechanically fastened to the outlet boxes. Many outlet boxes are rectangular, although a variety of other shapes are in common use. They are placed at diverse and varied physical locations throughout the framing, in accordance with the particular building plan or blueprints. The placement of outlets varies according to the job. The wall board, or other sheet like wall surface material, is conventionally placed over the framing after all wiring outlet and conduit boxes have been installed. Prior to installation there is no way to predict where the outlet boxes will be relative to the wall board, so custom fitting at the job site is the norm. Thus all wallboards are configured at the particular job site prior to installation. Suitable access holes must be cut in the panels to expose the outlet boxes secured to the framing.

The access openings must be accurately positioned cut to properly expose and align with the outlet and junction boxes after the drywall is installed. In other words, the drywall applicator must accurately factor in the number, position and shape of the outlet and junction boxes that will be "covered" by the wallboard panels he or she is installing. The relative position of the access openings must be carefully determined. The access holes may be cut before or after the wallboard is nailed into position.

Some installers cut access openings in the wallboard prior to nailing the panels to the frame. When access openings are formed before the drywall is installed, very careful measurements, and painstaking devotion to detail, are required. Often the panel must be placed, measured and scribed, cut, and then replaced and remeasured a number of times before the access holes are properly formed and aligned. The position and placement of each outlet box must be carefully determined, and this information must be carefully transferred to the wall board panel prior to cutting.

Others cut the access holes after nailing the premarked panel in place. Some installers cut the required access holes with a drywall knife. Some use a hammer and chisel or a keyhole saw. Care must be taken not to damage the outlet box or the area surrounding the access hole when the relatively crude cuts are made. In any event, the attainment of a high quality fit and finish requires considerable patience and skill. Those drywall applicators who are most able to achieve the desired quality are in great demand.

However, it is difficult and time consuming to repetitively make proper measurements. Even skilled craftsmen make mistakes from time to time, and sheet materials are wasted, and valuable time is lost. Electricians sometimes complain about access hole alignment, even where careful measurements have been made. Sometimes modifications to the drywall must be made by the electrician to accommodate dimensional misalignment. To remedy these problems a number of devices have been proposed in the prior art to make the marking and cutting of access orifices in wall board or other sheet like materials easier and more accurate. Devices have been proposed that can be mounted on the outlet boxes to position templates to guide cutting tools for forming the access opening. Examples are seen in U.S. Pat. Nos. 2,775,812, 2,788,151, 3,733,707, 3,823,754, 3,888,013, 3,733,707, 4,359,302, 4,730,395, 4,335,511, 4,059,905 and others.

Some prior art templates mount at least temporarily on the outlet boxes and present a projection that mark and/or penetrate the wall panel to provide a marking. Still, some measuring is required for reasonable accuracy. This technique has proven versatile with relatively soft gypsum wall board. Paneling made of harder materials are more difficult to penetrate with the template locating member. Many template tool are relatively large and cumbersome, The sharp, projecting blades or prongs are dangerous to transport, and sometimes difficult to use. It would be far better to provide a marking system comprised of small, disposable clip on members that easily mark the proper dimensions, and once used, can be discarded (i.e., removed and thrown away or left concealed behind the finished wall board.)

SUMMARY OF THE INVENTION

This invention provides a system for cutting access openings in wall board for providing access to electrical junction boxes, conduit boxes or receptacles or the like. Ideally the system comprises a plurality of small, disposable plastic clips that removably fit to the outlet boxes. The locator clips are preferably molded from plastic, and different models mount either to the corners or sides of conventional outlet boxes. Each locator clip presents a sharp, outwardly projecting prong that penetrates the wall board after it is pressed up against the wall stud and installed. The clips are attached to specific sections of the wall outlets or fixtures, so that when the wallboard is installed, the tradesman may use the projecting prongs as a marking guide. Optional guide templates may be used for this purpose.

Each clip firmly snaps onto the target outlet structure. A resilient frame supports a reduced size, offset subframe that is yieldably deflectable. A channel is formed between the frame and the subframe for captivating a portion of the outlet upon which the clip is forcibly inserted. The clips are configured to mark a spot with their projecting prongs forming the vertices of the desired access opening. The position of the prong relative to the body of the outlet box insures that only a properly sized access hole is marked for cutting. The prongs can easily be withdrawn with a pair of pliers, so time is not wasted by the drywall installer in removing the clips. Dimensions of the required access hole can be determined with or without a template, and cutting can begin. Once the panel is cut and the debris removed, the exposed access hole reveals enough of the body of the outlet box for the electrician to easily complete the wiring.

Most importantly, my clips reliably establish a dimensionally accurate guide for cutting an access opening that is big enough to present adequate room for wiring, but small enough so that it will be completely shrouded by the final cover plate or fixture installed on the outside of the panel. In other words, when installation is complete, the external cover plates or electrical outlet plates conceal the ragged periphery of the access opening to present a desirable aesthetic appearance.

Thus it is an object of my invention to provide a quick and inexpensive means of marking dry wall panels for cutting access outlets.

Another object is to provide inexpensive, disposable guide clips for locating access openings for electrical outlet boxes in typical construction panels.

Another basic object is to enable the marking of the required access holes without time consuming measuring and scribing.

A related object is to provide a means for precisely cutting predetermined shapes in sheet materials including dry wall and gypsum wall board panels.

It is another object of this invention to provide inexpensive, disposable snap-on clips that facilitate the extremely rapid cutting of access holes in sheet materials for forming walls. It is a feature of my invention that the panels need not be measured or marked prior to affixation to the studs, and the guide clips need not be removed or repositioned after nailing.

It is a further object of this invention to provide an access hole forming system that uses disposable clips that speed up the wallboard installation process.

Another object is to provide a safe clip of the character described. It is a feature of my invention that a dropped clip cannot stand up straight because means are provided to unlevel the clip.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
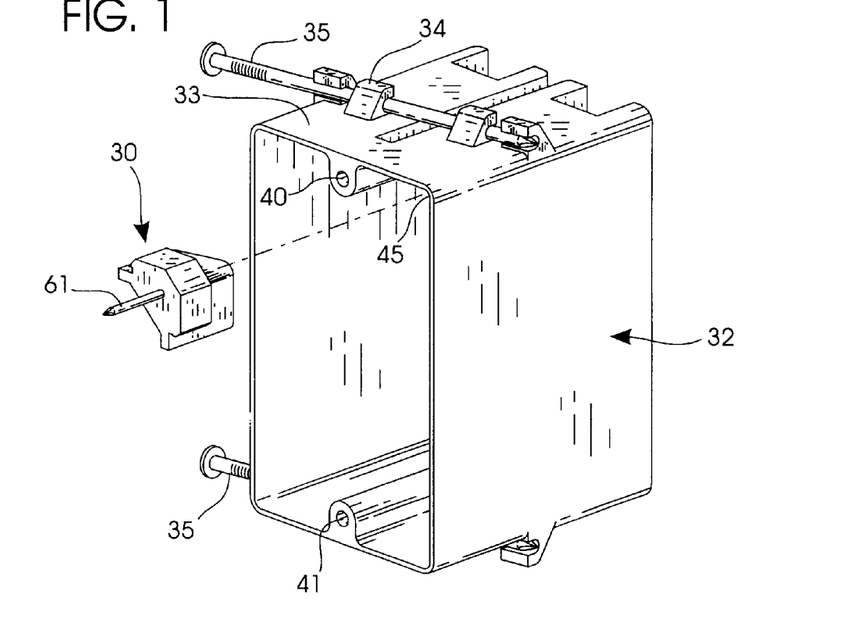
FIG. 1 is a partially exploded, front isometric view of a typical plastic outlet box and my preferred corner-mounting locator clip.
Figure 2:
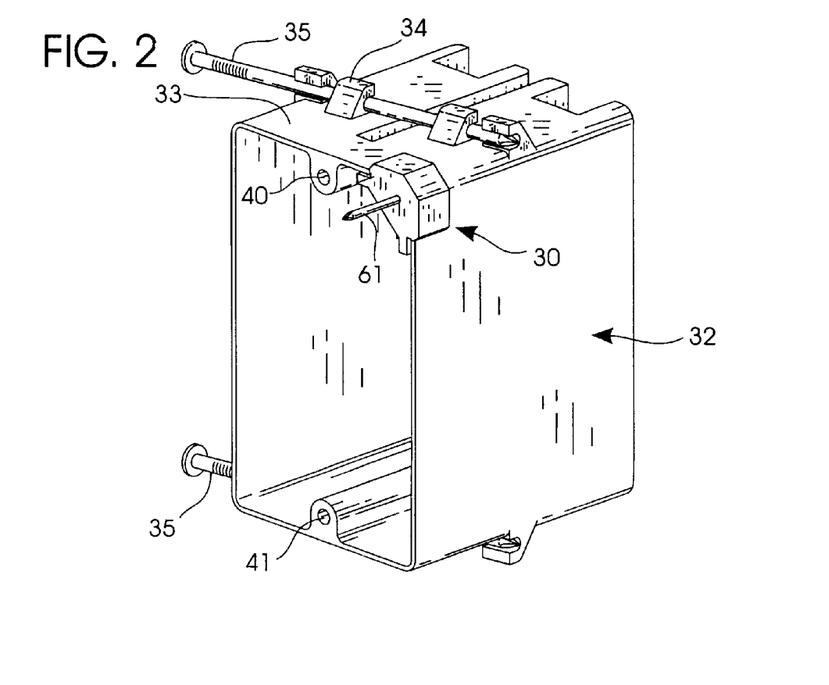
FIG. 2 is view similar to FIG. 1, but showing the locator clip attached.
Figure 3:
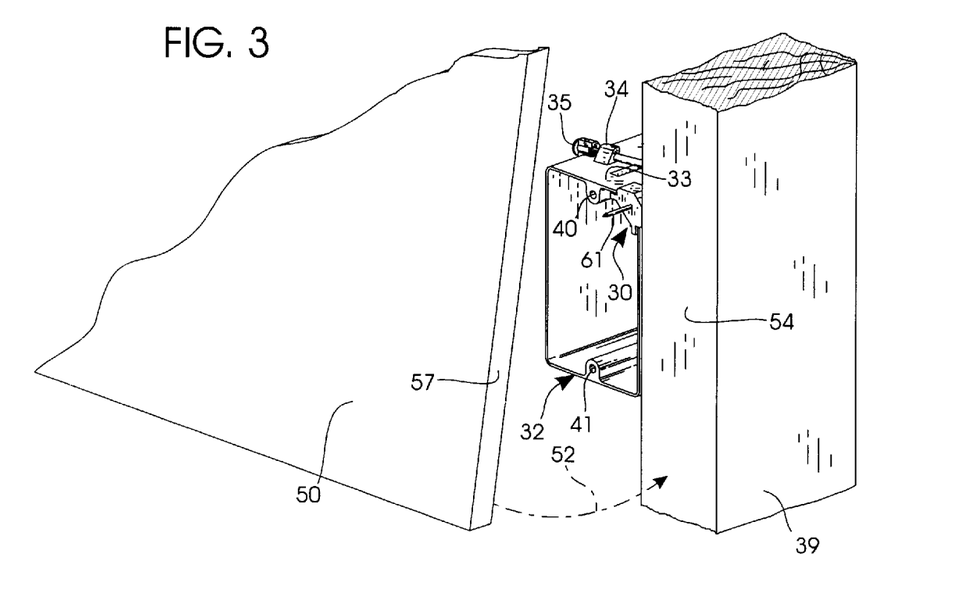
FIG. 3 is a fragmentary diagrammatic view showing wallboard being installed in a first technique.
Figure 4:
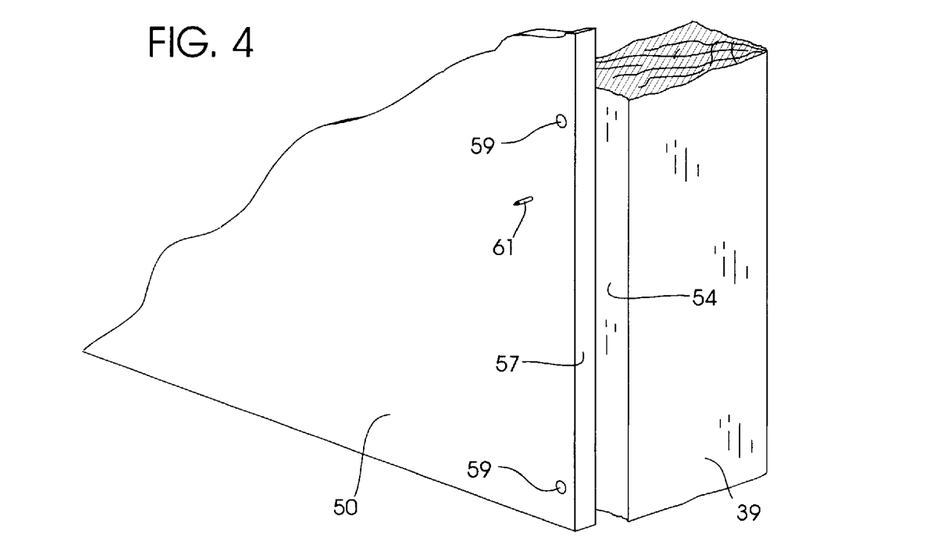
FIG. 4 is a view similar to FIG. 3, but showing the projecting marking prong after wallboard is pressed against the framing studs.

With initial reference now to FIGS. 1–4 of the appended drawings, a preferred corner locator clip has been generally designated by the reference numeral 30. It quickly snap-fits to a typical plastic outlet box or junction box 32 that is fastened to a stud 39 with a conventional nails 35. The top 33 of outlet box 32 has suitable aligned, apertured tabs 34 through which nails 35 are directed for mounting to an adjacent stud 39 (FIGS. 3, 4).

Figure 20:
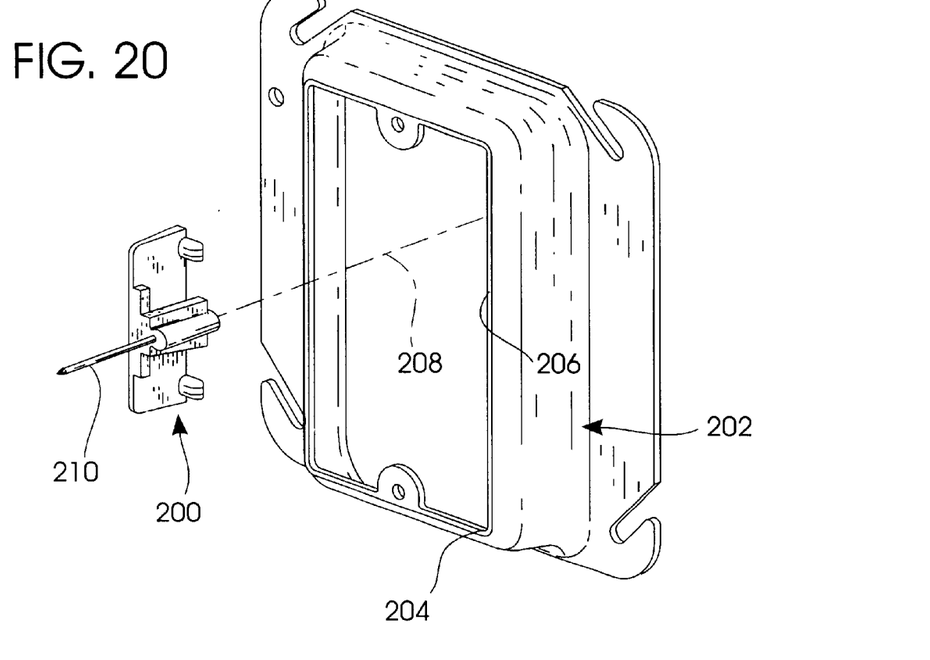
FIG. 20 is a partially exploded, front isometric view of a typical metal outlet box cover and my preferred, side-mounted locator clip.
Figure 21:
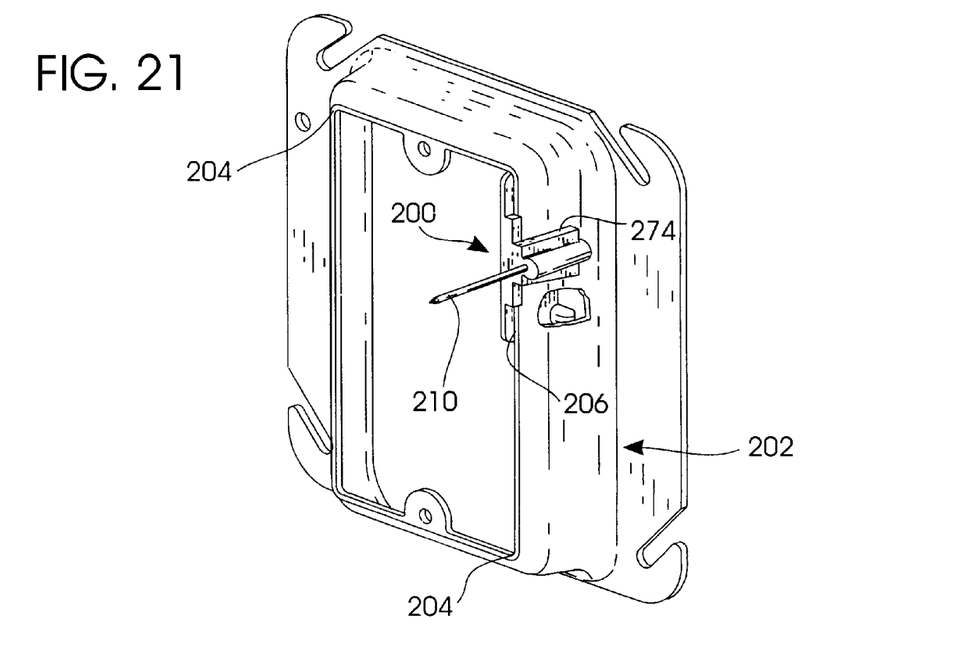
FIG. 21 is a front isometric view similar to FIG. 20, with portions broken away for clarity, showing the locator installed.
Figure 22:
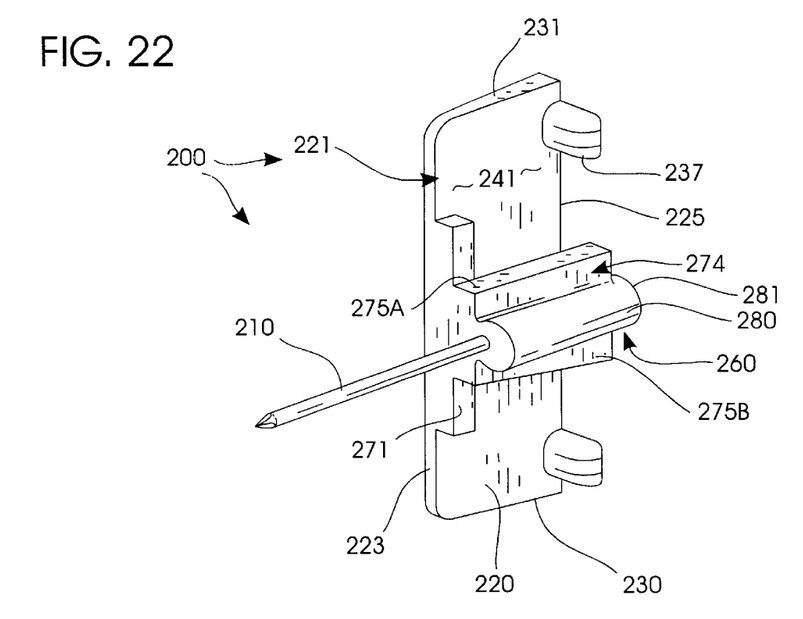
FIG. 22 is an enlarged, front isometric view of the side mounted locator clip.

The generally cubicle enclosure defined by the outlet box presents an interior in which electrical wiring terminations and connections may be made. For example, a conventional twin power outlet for 120 volt a. c. power may be fastened over box 32 with suitable screws that penetrate bosses 40, and 41. For purposes of this disclosure, the term "outlet box" refers not only to the plastic box of FIGS. 1–4, the metal box cover of FIG. 20, but to other generally rectangular outlet and junction boxes of various sizes and shapes. Such "outlets" or outlet boxes are associated with electrical wiring, cable television hook-ups, intercom systems, air conditioning fixtures, plumbing fixtures and the like.

In FIG. 2 it is apparent that locator clip 30 has been pressed against and fitted to the corner 45 of the outlet box 32. As explained hereinafter, the symmetrical construction of clips 30 readily facilitates snap-on attachment to any of the four corners of the outlet box as desired by the installer.

Figure 5:
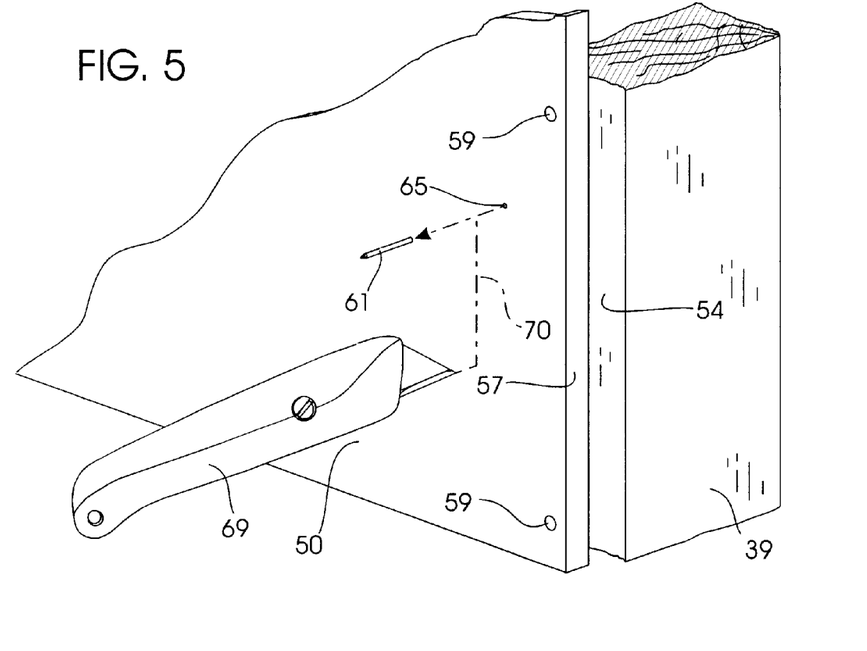
FIGS. 5 and 6 are similar to FIGS. 3 and 4, but show the initial and final access hole cutting.

In FIG. 3 a wallboard panel 50 is illustrated as it appears immediately prior to installation against a stud 39. As used herein, the term "wallboard" means any type of planar surface or covering for forming walls, including gypsum wallboard, veneers, particle board, sheet rock, plywood, drywall, or the like. By gently swinging it in the direction of the arrows 52, it will flushly come to rest against the outer surface 54 of the stud The wallboard edge 57 will come to rest approximately on the stud center so it will closely abut an adjoining panel added later. As nails 59 are conventionally installed, the outwardly projecting prong 61 of the corner locator will penetrate the panel, and be visible to the tradesman (FIG. 4). He may easily remove the exposed prongs 61 it as in FIG. 5, leaving a reference point 65 from which cutting begins.

Figure 6:
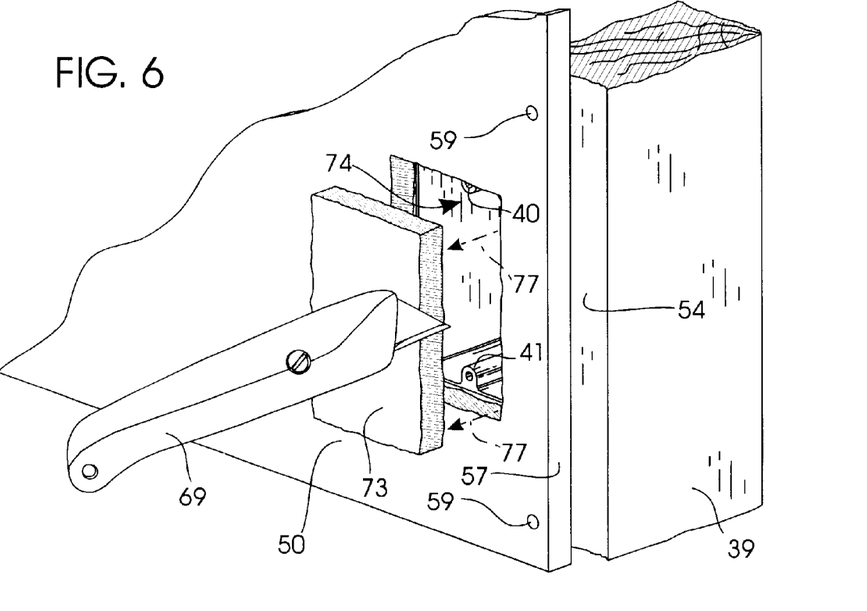

By grasping a suitable conventional wallboard cutting knife 69, a cut along pattern 70 may be made, so that the inner piece of wallboard 73 may be withdrawn from the now-exposed access hole 74, as indicated by arrows 77 (FIG. 6). The patterns used to cut the access hole may be developed from experience, or they may be drawn by using one of the electrical outlet boxes discussed. The resultant access hole 74 is sufficiently sized so as to allow complete access into the box interior. Moreover, the hole is precise enough so that when an electrical outlet cover plate, for example, is thereafter coupled to the access box by screws penetrating bosses 40, 41, the entire periphery of the cut will be concealed.

Figure 7:
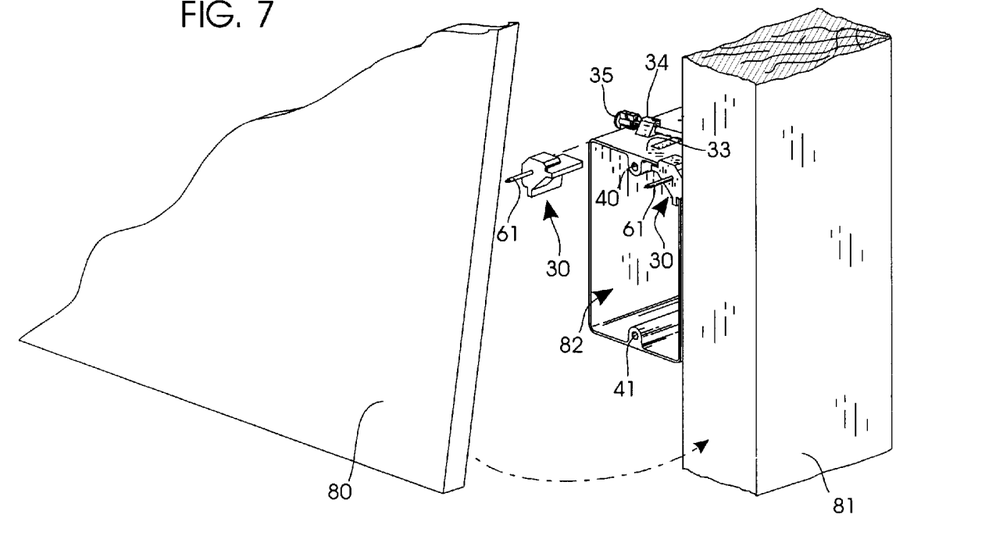
FIGS. 7 and 8 are fragmentary, diagrammatic views showing wallboard being installed and cut in a second technique using two corner clips and an exterior template.
Figure 8:
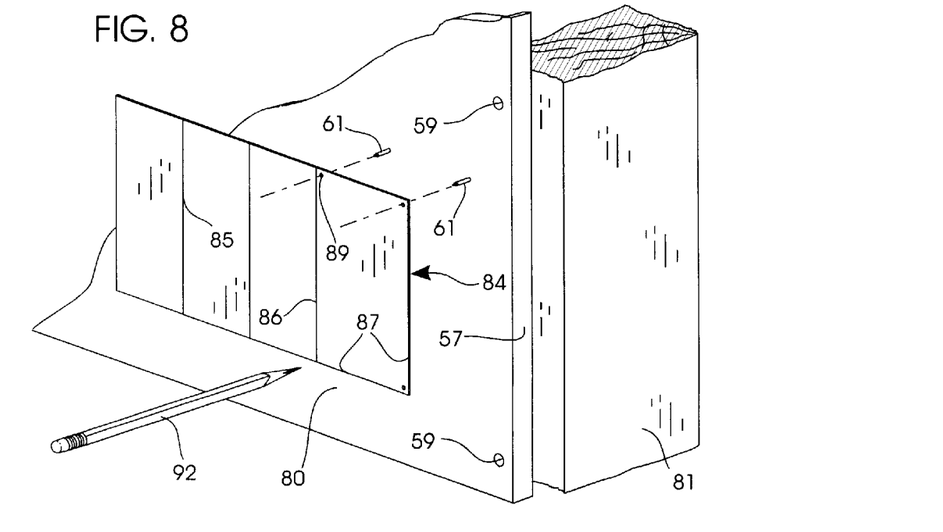

Turning to FIGS. 7 and 8, a similar wallboard panel 80 is to be attached to a stud 81. Box 82 has been fitted with a corner locator clip 30 in each of its upper corners. As the panel is nailed in place, prongs 61 penetrate the wallboard, as in FIG. 8. Prongs 61 may be withdrawn with pliers thereafter. Optionally a suitable template 84 may be used for alignment. For example, template holes 89 may be aligned with either clip prongs 61, or the exposed hole the prongs leave in the wallboard after prong removal. A drawing pattern fitting the intended size of the cut is established by the template, and simple marks are made with a pencil 92. Preferably, template 84 is made of paper, and it is disposable. It includes spaced-apart fold lines 85, 86 that dimensionally simulate the width of the needed access hole when properly folded.

Figure 9:
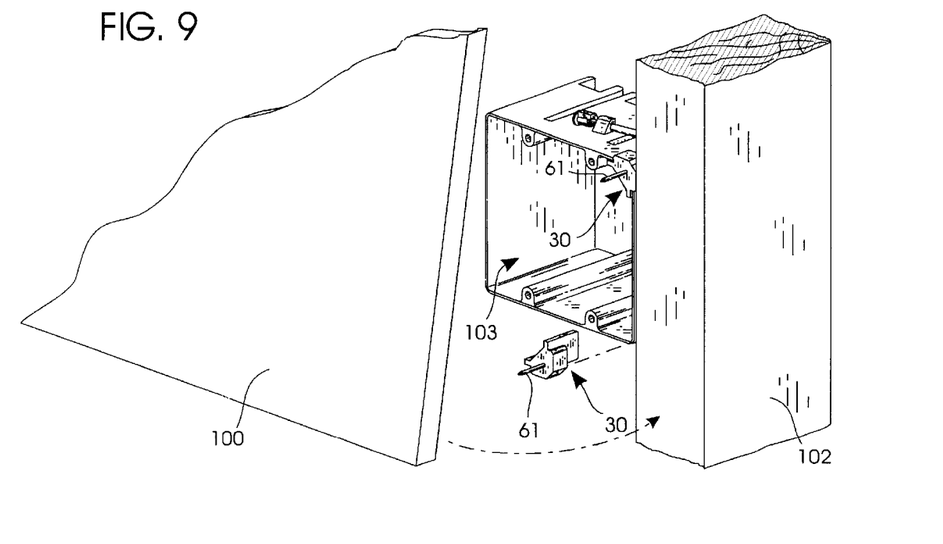
FIGS. 9 and 10 are fragmentary, diagrammatic views similar to FIGS. 7 and 8, showing wallboard being cut to accommodate a large junction box cover.
Figure 10:
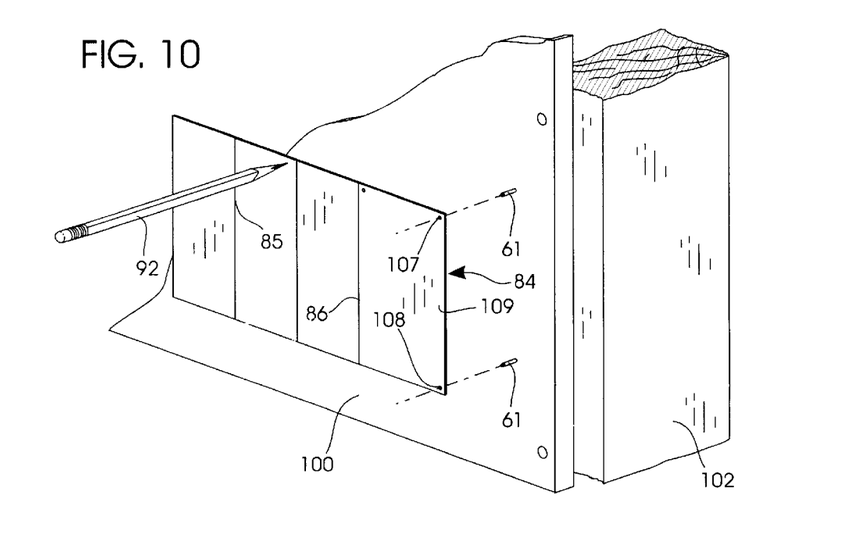
Figure 11:
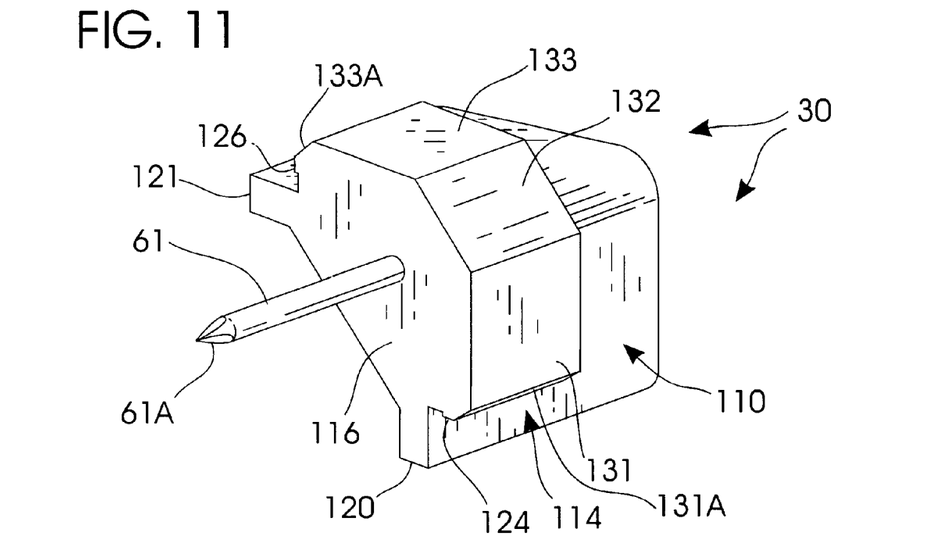
FIG. 11 is an enlarged, front isometric view of a preferred corner locator clip, emphasizing its exterior.

Similarly, FIGS. 9 and 10 illustrate how a larger access hole may be cut in a panel 100 to encircle larger junction or outlet box 103 on stud 102. Here a pair of corner locators are used on the top and bottom right side corners of the junction box 103. Prongs 61 (or the holes they leave behind after removal) can register with side orifices 107, 108 in optional paper template 109. Template 109 is similar to template 84 discussed above.

Figure 12:
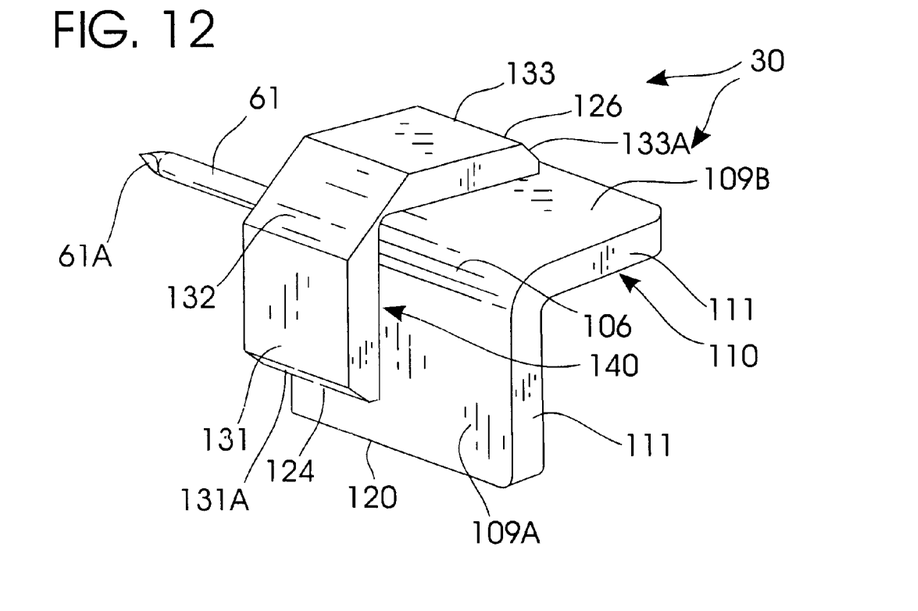
FIG. 12 is a rear isometric view of the corner clip.
Figure 13:
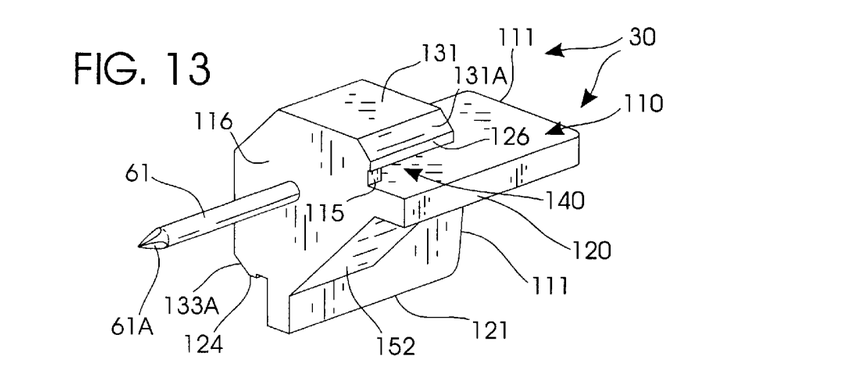
FIG. 13 is a front isometric view similar to FIG. 11, but rotated ninety degrees to reveal the preferred interior.

Turning now to FIGS. 11–19, the preferred corner clip 30 is made from molded plastic, and, except for the removable prong 61, comprises an integral unit. The preferred frame 110 is preferably L-shaped in cross section. It has a pair of integral legs 120, 121 that meet orthogonally at the frame midpoint 106 (FIG. 12). Its length extends from the front face of the clip to rearmost edges 111 (FIG. 12).

Figure 19:
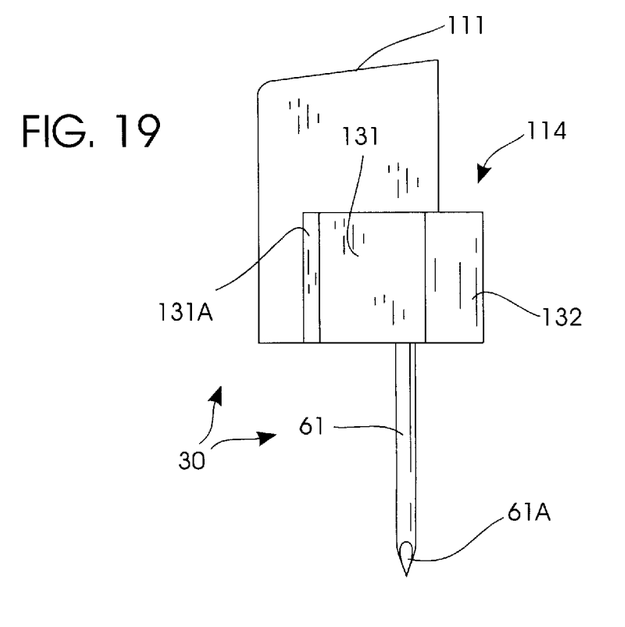
FIG. 19 is a top plan view of the preferred corner clip taken generally from the top of FIG. 14.

As best viewed in FIG. 19, frame terminal edges 111 are preferably angled with respect to the body of the unit. In other words, they are preferably not parallel with the front face of the clip. In this manner the clip will be rendered "unlevel" and unstable, and if dropped accidentally, it will be unable to land "straight up" with the prong 61 sticking straight up. Unleveling of the frame profile prevents a stable vertical position from being obtained by a dropped clip. Thus potential foot punctures and injuries are thus avoided.

Figure 16:
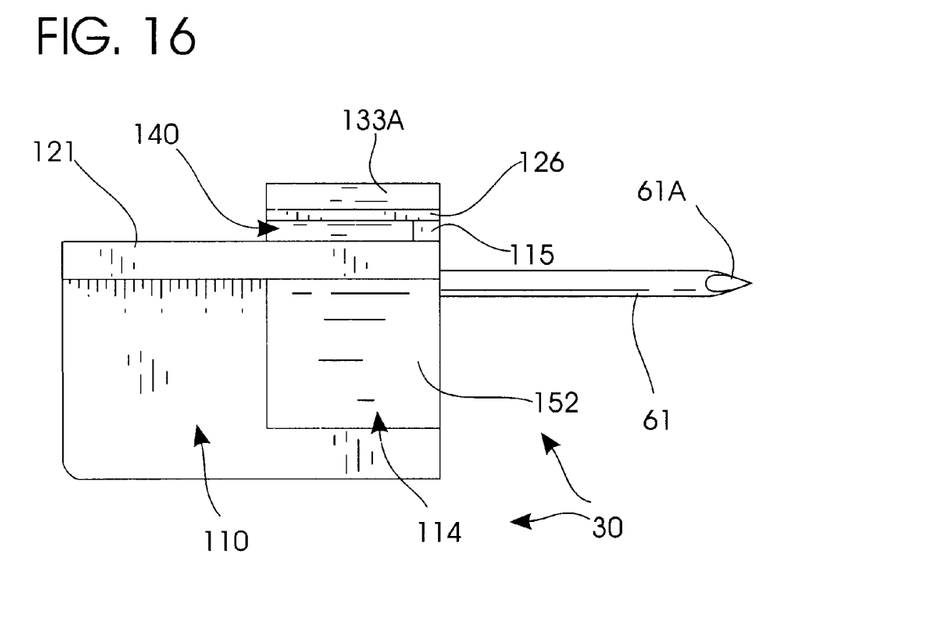
FIG. 16 is a side elevational view of the preferred corner clip taken generally from the left of FIG. 14.
Figure 17:
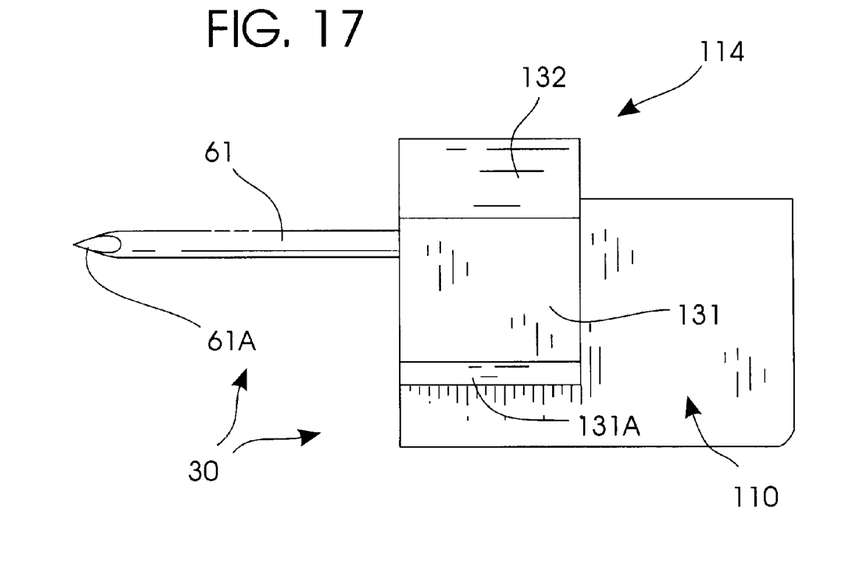
FIG. 17 is a side elevational view of the preferred corner clip taken generally from the right of FIG. 14.
Figure 18:
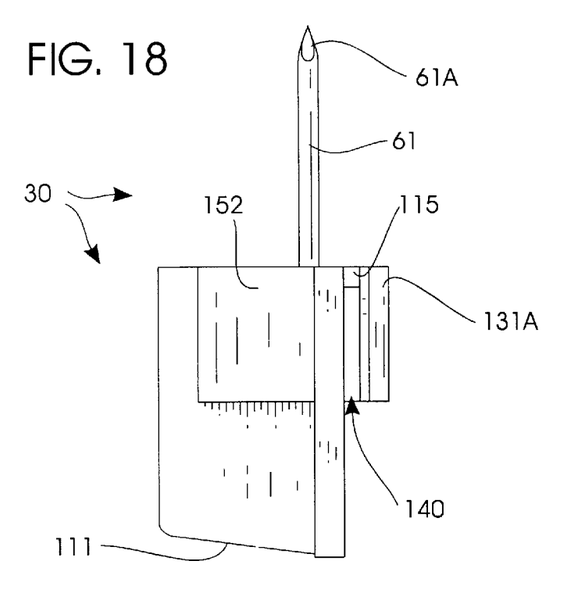
FIG. 18 is a bottom plan view of the preferred corner clip taken generally from the bottom of FIG. 14.

A subframe 114 of reduced dimensions is similar to frame 110. Subframe 114 is spaced apart from and disposed over frame 110, integrally extending to and terminating in the flat, front face 116 of the clip 30. The subframe is secured to the periphery of the frame over the frame midpoint 106. It projects rearwardly from the front of the clip 30 and terminates short of the frame rearmost edges. A resilient, narrow wall 115 forming outer face 116 joins the subframe to the frame. As best seen in FIG. 16, the length of the subframe 114 is preferably less than half of the length of frame 110. Further, subframe 114 is positioned substantially The lower leg portions 120, 121 of frame 110 respectively extend beyond the extent of the subframe leg portions 124, 126 (FIGS. 11, 13–15). The subframe 114 preferably comprises three abutting and adjoining, integral outer faces 132, 131, and 133. Faces 131, 133 form the outer surface of legs 124, 126 respectively. Prong 61 is preferably secured to the subframe. The prong extends from face 116 to its sharp point 61 A.

Each subframe is beveled to substantially reduce potential interference with the tool used to cut the access hole. There is a junction edge between each subframe leg 124 or 126 and the outer surface 131 or 133. These edge portions 131A and 133A (FIG. 13) are preferably beveled slightly. Thus, for example, when a knife blade contacts the concealed locator it will not be deflected away from the cutting path.

Figures 14, 15:
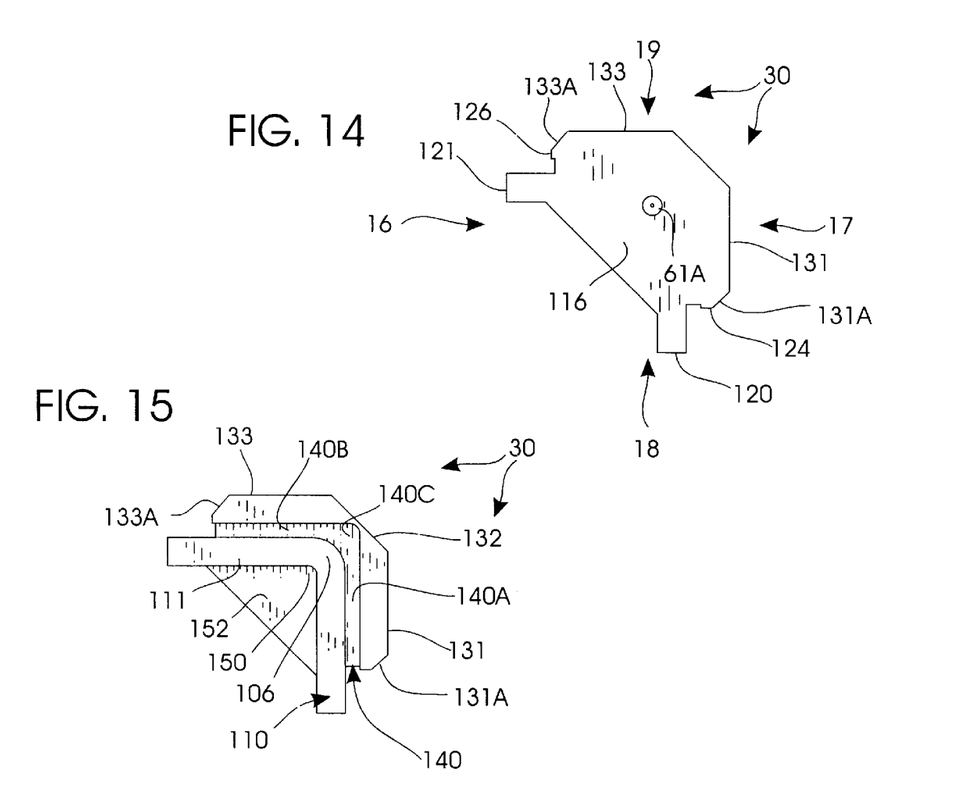
FIG. 14 is a front plan view of the preferred corner clip, taken generally from a position in front of FIG. 11.
FIG. 15 is a rear plan view of the preferred corner clip.

As best seen in FIGS. 12 and 15, an L-shaped, ledge receptive channel 140 is formed between the frame 110, subframe 114, and wall 115. Linear portions 140A and 140B of channel 140 are similarly shaped and present a substantially uniform width to the edge of the outlet box which is sandwiched between the frame and subframe when the clip is installed. The channel midpoint 140C (FIG. 15) is preferably wider than channel portions 140A, 140B. It is larger to accommodate the resilient flexing action needed to snap fit to the outlet box corner. In the best mode it is approximately 50% wider than the channel portions 14A, 140B.

The interior vertex 150 (FIG. 15) of frame 110 is reinforced by web 152, that is substantially coextensive with the length of the subframe 114. Web 152 is shaped substantially like a miniature pyramid. It provides adequate mass to firmly but yieldably receive the unsharpened end of the removable prong 61. However, its mass is limited to avoid inhibiting the resilient flexing that takes place between the frames and subframes when they engage and sandwich the outlet box corner.

Turning now to FIGS. 20–23, the preferred side mounted clip 200 is ideal for larger metallic outlet boxes, or box reducers like box cover 202 that have curved or arcuate edges 204. Clip 200 is installed similarly to clip 30 previously discussed in detail. It is pressed into position upon the side 206 of a typical junction box cover 202 by firmly moving it in the direction of dashed lines 208 until a snap-fit occurs. A rigid, removable prong 210 extends outwardly from the body of the clip 200, and penetrates wall board panels when they are installed substantially as shown in FIGS. 1–10 previously discussed.

With additional reference now directed to FIGS. 22–28, except for prong 210, clip 200 is preferably molded from plastic as an integral unit. Clip 200 comprises an elongated, generally rectangular frame 221 having a front edge 223 normally projecting towards the installer and a rear edge 225 that is concealed upon installation. The approximate midpoint or center of the frame 222 divides the frame into two, integral legs 222A, 222B (FIGS. 24, 27) which are coplanar in this embodiment. The legs 222a, 222B terminate respectively in spaced apart frame sides 230, 231. The frame is preferably wedge shaped; its thickness at front edge 223 is approximately half the thickness at rear edge 225 (FIGS. 22, 23) The preferred wedge profile of the frame is best seen in cross section in FIG. 26. A pair of integral, spaced apart bosses 237 project upwardly from frame surface 241 to force a limited deflection between the frame and a subframe 260 when the clip 200 is installed.

Figure 26:
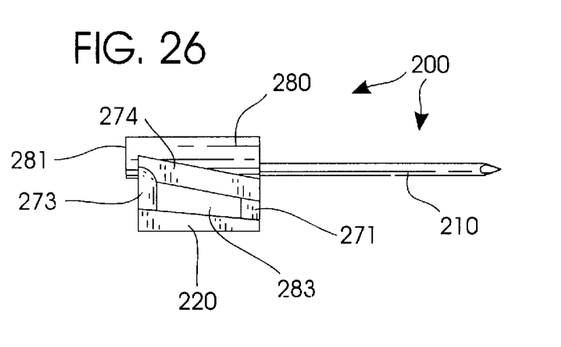
FIG. 26 is a bottom plan view of the side mounted locator clip.
Figure 27:
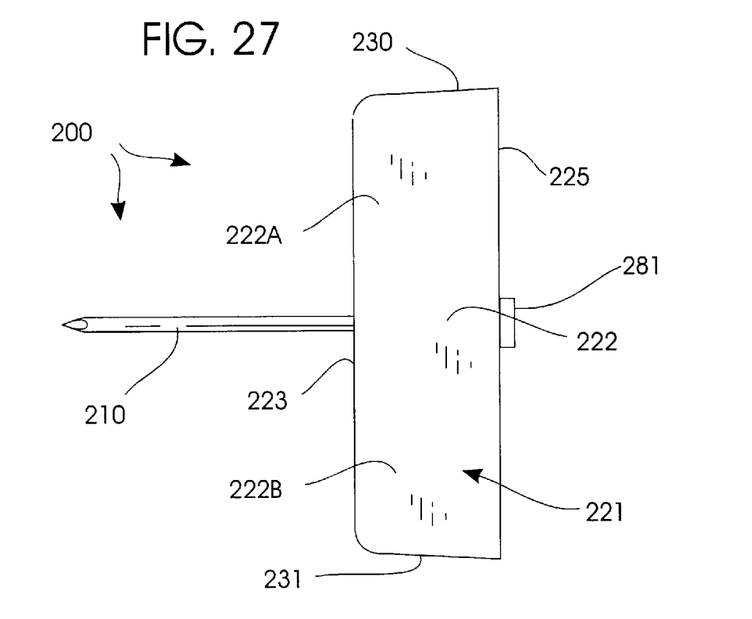
FIG. 27 is a side elevational view of the side mounted locator clip.
Figure 28:
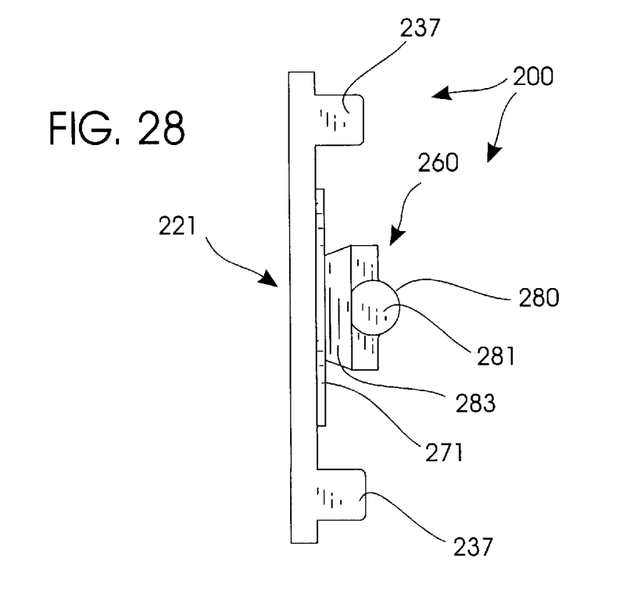
FIG. 28 is a rear plan view of the side mounted locator clip.

The spaced-apart subframe 260 is integral with the frame and it is preferably positioned substantially at the frame midpoint. The spacing defines a surface-receptive channel 283 (FIG. 23) therebetween that admits a portion of the outlet box edge when clip 200 is installed. The frame and subframe tightly engage the outlet box with a portion of the box frame sandwiched therebetween. The subframe is integral with and supported by a generally rectangular wall 271 (FIG. 22) parallel with but shorter than frame front surface 223. An angled, rectangular plate 274 extends integrally away from the wall 271 towards the back of the clip. Preferably it projects rearwardly at an acute angle from the horizontal as seen in FIG. 26. In the best mode, plate 274 is integral with an elongated, reinforcing cylinder 280 that removably holds prong 210. Cylinder 280 horizontally projects towards the front, and is coextensive with plate 274 substantially at the midpoint thereof Plate 274 comprises a pair of coplanar, outwardly extending legs 275A, 275B that extend away from the center of plate 274 beneath cylinder 280.

Figure 23:
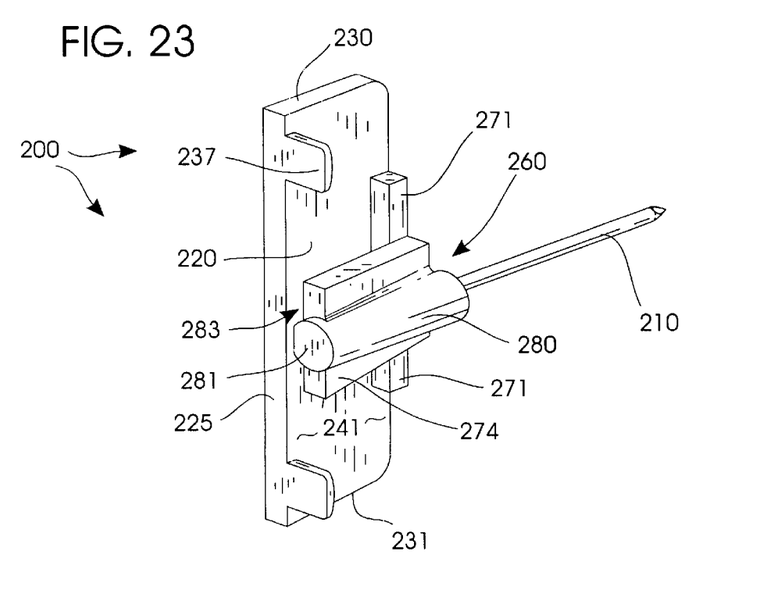
FIG. 23 is a rear isometric view of the side mounted locator clip.
Figure 24:
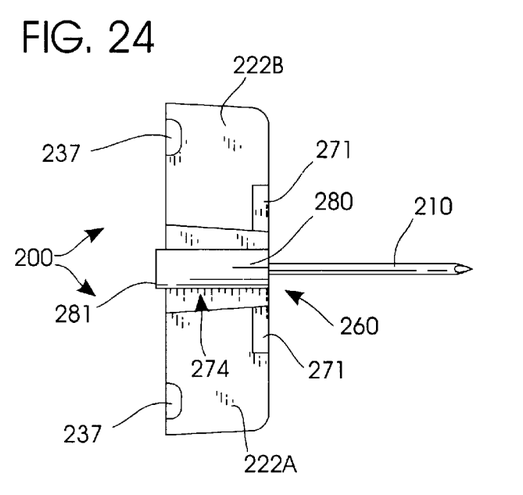
FIG. 24 is a side elevational view of the side mounted locator clip.

Importantly, cylinder 280 is intentionally configured to unbalance the clip. If a clip 200 is accidentally dropped by a workman, it cannot stand erect with the projecting prong exposed. It will not land pointing its prong 210 straight up so that a workman will not step on a prong and injure himself or herself. Therefore, as best seen in FIGS. 23, 24, and 26, the cylinder rear end 281 projects outwardly from the subframe. In other words, a safety offset is created so the clip cannot stand erect properly. Instead, it tilts over when dropped, and lies horizontally rather than vertically.

Figure 25:
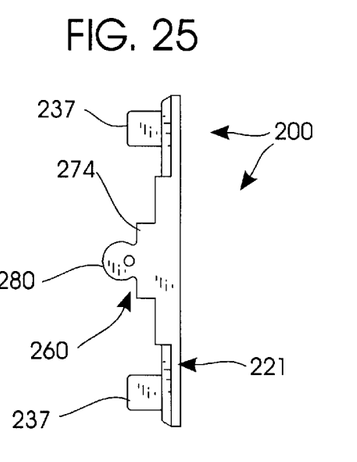
FIG. 25 is a front plan view of the side mounted locator clip.

When installed, a metallic edge portion of the junction box over occupies the channel-like space 283 (FIGS. 23, 28) between frame 221 and subframe 260. Resilient, captivating deflection between the frame and subframe is promoted by the bosses 237 previously discussed. Preferably these bosses are stiff and upright, enabling the locator clip 200 to firmly grasp the outlet to which it is fastened. Through the preferred construction as aforesaid, clip 200 accommodates the regularly curved edge 206 (FIG. 20) of the metallic outlet box by the combined yieldable deflection between subframe plate 274 and the wedge shaped frame base 211. The preferred angular construction of the subframe and the extent of the projecting bosses 237 forces the clip 200 to grasp the edge of the outlet once released, and it is effectively snap fitted as the resilient parts aforedescribed seek to clamp themselves about the metal structure of the outlet box. Preferably, as seen in FIG. 25, the length of bosses 237 extends them from the frame to a level approximately parallel with plate 274.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A resilient clip adapted to be attached to corners of an outlet or fitting for locating access holes in wallboard, said clip comprising:

a front face and a rear;

a resilient, generally L-shaped frame extending between said front face and said rear and terminating at said rear in rearmost edges, said frame comprising a midpoint and a pair of integral, projecting substantially perpendicular frame legs meeting at said midpoint and extending away therefrom;

an integral, subframe extending rearwardly from said face and spaced apart from and disposed over said frame, said subframe yieldably deflectable with respect to said frame, and said subframe comprising a pair of integral, substantially perpendicular subframe legs parallel to and overlying said frame legs and each subframe leg comprising an outer subframe face, a resilient wall that joins said subframe to said frame, an outer surface of the wall forming said front face;

a generally L-shaped channel defined between said frame and subframe; and, an outwardly projecting prong extending perpendicularly away from said front face for penetrating wallboard for locating an access hole that is to be cut after said clip is press fitted to a corner of said outlet or fitting, said prong being offset from said midpoint so as to be oriented in a position circumscribed by the outlet or fitting when the clip is installed.

2. The clip as defined in claim 1 wherein for safety purposes said rearmost edges of said frame occupy a plane that is not parallel with said front face so that a dropped clip is unlikely to assume a dangerous position with said prong sticking straight up when inadvertently dropped onto a flat supporting surface.

3. The clip as defined in claim 1 wherein said prong is removable.

4. The clip as defined in claim 1 wherein the frame has a length, the subframe has a length, and the length of the subframe is less than the length of said frame to aid in the flexing of said wall during installation of the clip.

5. The clip as defined in claim 4 wherein said subframe comprises a third subframe face that intersects the subframe leg outer faces and is generally parallel with said frame midpoint and said prong to lessen interference with cutting saw or tool blades.

6. A resilient plastic clip adapted to be attached to corners of an outlet or fitting for locating access holes in wallboard, said clip comprising:

a front face and a rear;

a resilient, generally L-shaped frame extending between said front face and said rear, said frame comprising a pair of downwardly projecting legs extending rearwardly from said front face and intersecting each other to form said midpoint, the legs terminating in rearmost edges;

an integral, generally L-shaped subframe extending rearwardly from said face and spaced apart from and disposed over said frame, said subframe yieldably deflectable with respect to said frame, and said subframe comprising a pair of downwardly projecting subframe legs that are shorter and smaller than said frame legs and parallel therewith;

a resilient wall that joins said subframe to said frame, the wall bordering said front face;

a generally L-shaped channel defined between said frame and subframe; and, a user-removable prong projecting perpendicularly away from said front face for penetrating wallboard for locating an access hole that is to be cut, said prong being offset from said midpoint so as to be oriented in a position circumscribed by the outlet or fitting when the clip is installed.

7. The clip as defined in claim 6 wherein for safety purposes said rearmost edges of said frame occupy a plane that is not parallel with said front face so that a dropped clip is unlikely to assume a dangerous position with said prong sticking straight up when the clip is inadvertently dropped onto a flat supporting surface.

8. The clip as defined in claim 7 wherein the length of the subframe is less than half the length of said frame.

9. The clip as defined in claim 8 wherein the frame comprises an interior vertex and a reinforcing web within said vertex substantially coextensive with the length of the subframe.

10. The clip as defined in claim 8 wherein said subframe comprises a third subframe face that intersects the subframe leg outer faces and is generally parallel with said frame midpoint and said prong to lessen interference with cutting saw or tool blades.

11. The clip as defined in claim 10 wherein for safety purposes said rearmost edges of said frame occupy a plane that is not parallel with said front face so that a dropped clip is unlikely to assume a dangerous position with said prong sticking straight up towards an installer when the clip is inadvertently dropped onto a lower, flat supporting surface.

12. The clip as defined in claim 11 wherein the channel comprises a midpoint wider than bordering channel portions to provide the resilient flexing action needed to snap fit the clip to the outlet box corner.

13. A resilient plastic clip adapted to be attached to corners of an outlet or fitting for thereafter marking and cutting access holes in wall surfaces, said clip comprising:

a flat front face;

a rear;

a resilient, generally L-shaped frame extending between said front face and said rear, said frame comprising a pair of frame legs that are perpendicular to one another and which meet at a midpoint, the frame legs extending rearwardly from said face and terminating in rearmost edges;

an integral, generally L-shaped subframe that is smaller than the frame but similarly shaped, the subframe comprising a first and second subframe legs that are shorter than said frame legs and which are spaced apart from and parallel with said frame legs, said subframe yieldably deflectable with respect to said frame, said subframe comprising a first outer face on said first subframe leg, a second outer face on said second subframe leg, and a third outer face intersecting said first and second subframe outer faces to minimize interference with a cutting tool or blade;

an integral, resilient wall that joins said subframe to said frame;

a generally L-shaped channel defined between said frame and subframe; and, a sharp, user-removable prong projecting perpendicularly away from said front face for penetrating wallboard for locating an access hole that is to be cut, the axis of said prong being inwardly offset from said midpoint so as to be oriented in a position circumscribed by the outlet or fitting when the clip is installed.

14. The clip as defined in claim 13 wherein said rearmost edges of said frame occupy a plane that is not parallel with said front face so that a dropped clip is unlikely to assume a position with said prong sticking straight up when the clip is inadvertently dropped onto a flat supporting surface.

15. The clip as defined in claim 14 wherein the channel comprises a midpoint wider than bordering channel portions to provide the resilient flexing action needed to snap fit the clip to the outlet box corner.

* * * * *